United States Patent [19]

Doherty, Jr.

[11] 4,026,464
[45] May 31, 1977

[54] DUAL FUNCTION THERMAL VALVE
[75] Inventor: John Doherty, Jr., Assonet, Mass.
[73] Assignee: Texas Instruments Incorporated, Dallas, Tex.
[22] Filed: Dec. 18, 1975
[21] Appl. No.: 641,795
[52] U.S. Cl. .................... 236/48 R; 123/117 A; 137/625.5; 236/87; 236/101 B
[51] Int. Cl.² .......................... G05D 23/10
[58] Field of Search ........... 236/87, 101 A, 101 B, 236/101 C, 99 E, 86, 48 R; 123/117 A; 137/625.27, 625.5

[56] References Cited
UNITED STATES PATENTS

| 3,329,165 | 7/1967 | Lang | 137/627.5 |
|---|---|---|---|
| 3,540,422 | 11/1970 | Kelly | 123/117 A |
| 3,595,474 | 7/1971 | Humpert | 236/12 R |
| 3,704,697 | 12/1972 | Weymann | 123/117 A |
| 3,930,515 | 1/1976 | Kennedy et al. | 123/117 A X |
| 3,960,321 | 6/1976 | Steele, Jr. | 137/627.5 X |

Primary Examiner—William E. Wayner
Assistant Examiner—William E. Tapolcai, Jr.
Attorney, Agent, or Firm—John A. Haug; James P. McAndrews; Harold Levine

[57] ABSTRACT

An improved, dual function, thermal valve assembly has three ports and two passages connecting these three ports to a common chamber. The assembly employs two thermally responsive actuating members which are actuable to move a valve plug in the chamber at different temperatures to provide a first temperature region wherein the plug seals port one so that only ports two and three are in communication, a second temperature region wherein the plug does not seal any of the ports so that ports one, two, and three are in mutual communication, and a third temperature region wherein the plug seals port three so that only ports one and two are in communication.

12 Claims, 5 Drawing Figures

DUAL FUNCTION THERMAL VALVE

BACKGROUND AND SUMMARY OF THE INVENTION

This invention relates to a thermally actuated valve assembly and more particularly to a dual function thermal vacuum valve useful for instance in automotive emission control systems. Various thermally actuated valves have been used for automotive applications. For example, wax actuated valves have long been used. These valves consist of a spool valve which is actuated by a volume change of wax upon reaching a predetermined temperature. These valves, however, due to the high pressure build-up are subject to loss of wax and consequently a shift of operating temperature and are actuable at only one temperature. Additionally they are costly to manufacture.

Dual function valves incorporating a bimetallic disc as the actuating means such as described in co-pending application Ser. No. 530,800, entitled Double Throw Thermal Valve, filed Dec. 9, 1974, having the same assignee as the present application have also been used. Their use has proved successful but still these valves have the inherent disadvantage for certain applications of being actuable at only one temperature.

It is an object of this invention to provide a thermally responsive valve assembly actuable at more than one temperature. It is another object to provide a thermally responsive dual function valve which is compact in size, reliable and to which three pieces of tubing or the like may be readily connected at one end of the valve assembly. It is yet another object to provide a valve assembly which minimizes deleterious compression of elastomeric valve seal means. Other objects and features of this invention will be in part apparent and in part pointed out hereinafter.

Briefly the double throw thermally responsive valve assembly of this invention comprises a two part valve body, a first part having three ports extending from the valve body and a second part with a central cavity in which the first part is partially housed. In the first part, passages connect the respective ports to a common chamber and valve seats are formed around two of the passages at the top and bottom of the chamber respectively. In the bottom of the cavity in the second part, a stop or support post is disposed upon which a multimember thermostatic disc assembly is mounted. The assembly comprises two preformed thermostatic disc members with a spring member between contained within a disc carrier or housing member. The two disc members are provided to be actuable at different predetermined temperatures. Touching the top of the disc assembly is a motion transfer pin which is biased toward the disc by a spring. The transfer pin extends up out of the second part of the valve body into the chamber in the first part to contact a valve plug or rubber stopper which acts as a valve seal for both a top and a bottom valve seat.

Initially, in a first temperature range, engagement of the disc assembly with the support post and the transfer pin holds the rubber stopper plug or valve seal in position to engage and close off the top valve seat providing for communication only between ports two and three. At a predetermined second temperature, one of the disc members snaps to an inverted dish-shaped configuration which causes the valve seal to move out of engagement with the first top valve seat and to also hold the seal out of engagement with the bottom valve seat thereby providing communication among ports one, two, and three. Then at a third predetermined temperature, the second of the disc members snaps to an inverted dish-shaped configuration which causes the valve seal to come into engagement with the bottom valve seat thereby providing communication between only ports one and two.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
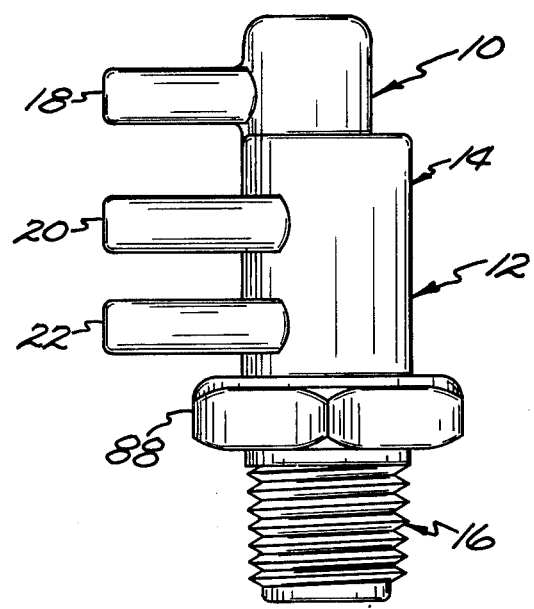
FIG. 1 is a front plan view of the valve assembly of this invention.

Referring now to the drawings, a dual function thermally responsive valve assembly 10 of this invention has a two-part generally cylindrical valve body 12 comprising a first valve part 14 and a second valve part 16. The first valve body part 14 as shown in FIGS. 1–4 has first, second, and third ports 18, 20, and 22 which open generally perpendicular to the main axis of the body part 14. The three ports 18, 20, and 22 each having central bores 24, 26, and 28 respectively which run the entire length of the ports and respective external nipple portions 30, 32, and 34. First valve part 14 and ports 18, 20, and 22 are preferably made from one piece of material such as glass-filled nylon. Ports 18, 20, and 22 are typically connected with tubing (not shown) which run between valve 10 and vacuum or vent sources and control functions which the valve operates. The disposition of ports 18, 20, and 22 are conveniently parallel and adjacent to one another yielding a valve which is compact in size.

Central bores 24, 26, and 28 all connect with a central chamber or cavity 36 within first valve part 14. Bores 26 and 28 lead directly into cavity 36 whereas bore 24 leads into a connecting passage 38 which in turn leads to cavity 36. The outlet of connecting passage 38 into cavity 36 functions as the upper or first valve seat 40 for valve assembly 10 to be discussed further below.

Anchored within cavity 36 as by press fitting is a bushing 42 having a central hub 44 depending therefrom and having an axially extending bore 46 running through bushing 42 comprising a large diameter portion 48 and a smaller diameter portion 50. In addition to axially extending bore 46 bushing 42 has a laterally extending bore 52 positioned in hub 44 in communication with bore 46 preferably adjacent to central bore 28 and perpendicular to axially extending bore 46 which provides a passage between port 20 and port 22. The passage extends from port 20 to cavity 36 through large diameter portion 48 and laterally extending bore 52 to cavity 36 and to port 22. The small diameter portion 50 serves to maintain proper alignment of a transfer pin 54 to be discussed below. Bushing 42 may be made from glass-filled nylon similar to the material for first valve part 14.

Figure 2:
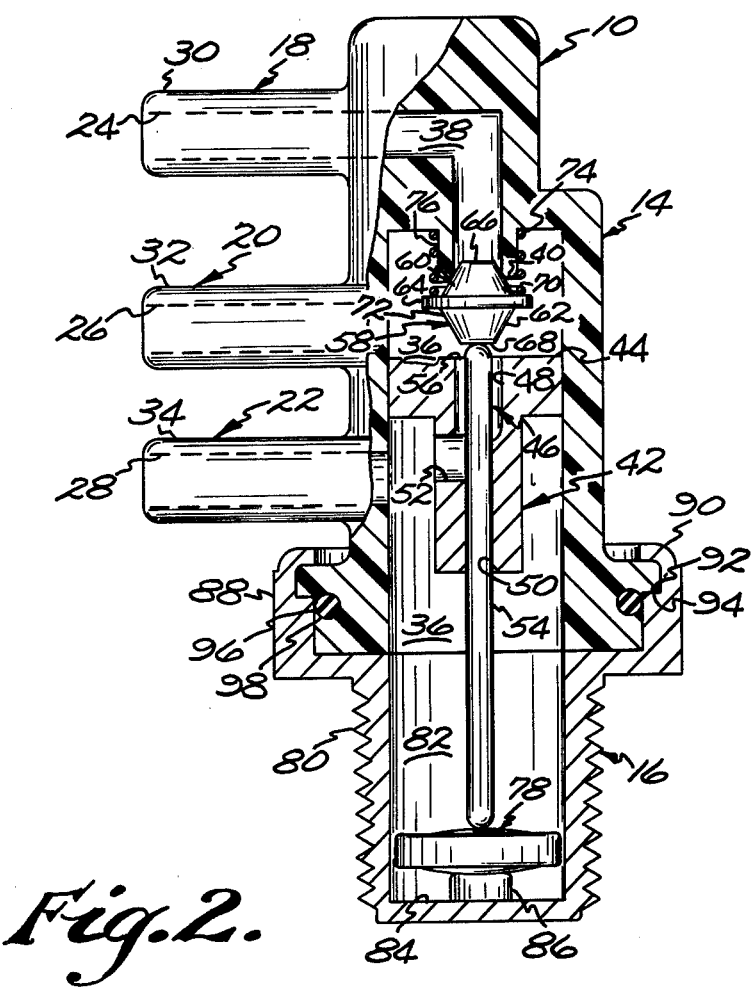
FIG. 2 is an enlarged partial sectional view of FIG. 1 with upper valve seat closed.
Figure 3:
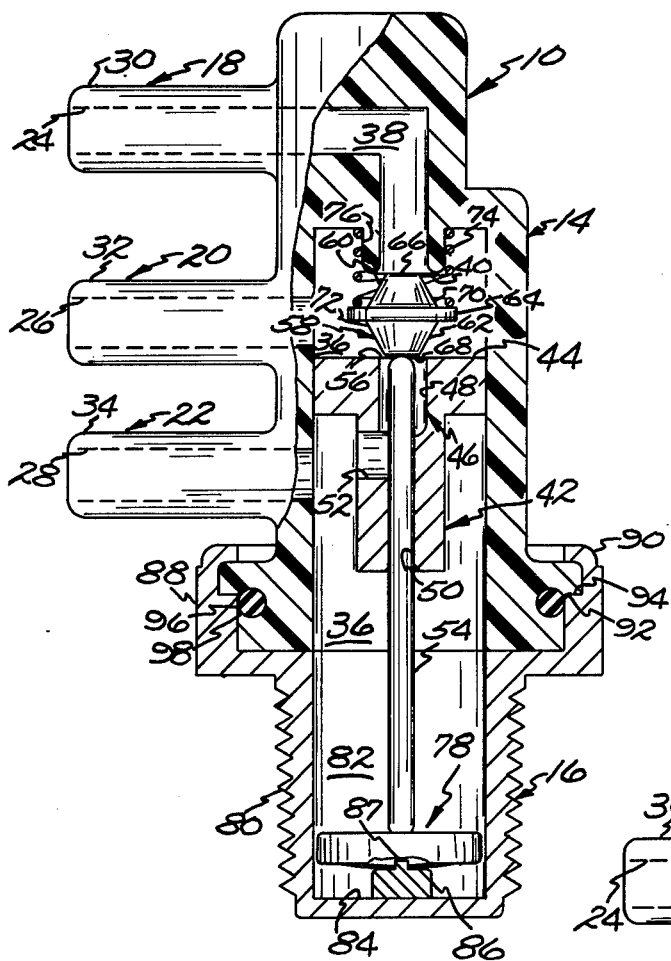
FIG. 3 is a similar view to FIG. 2 only with neither the upper valve seat nor a lower valve seat closed.
Figure 4:
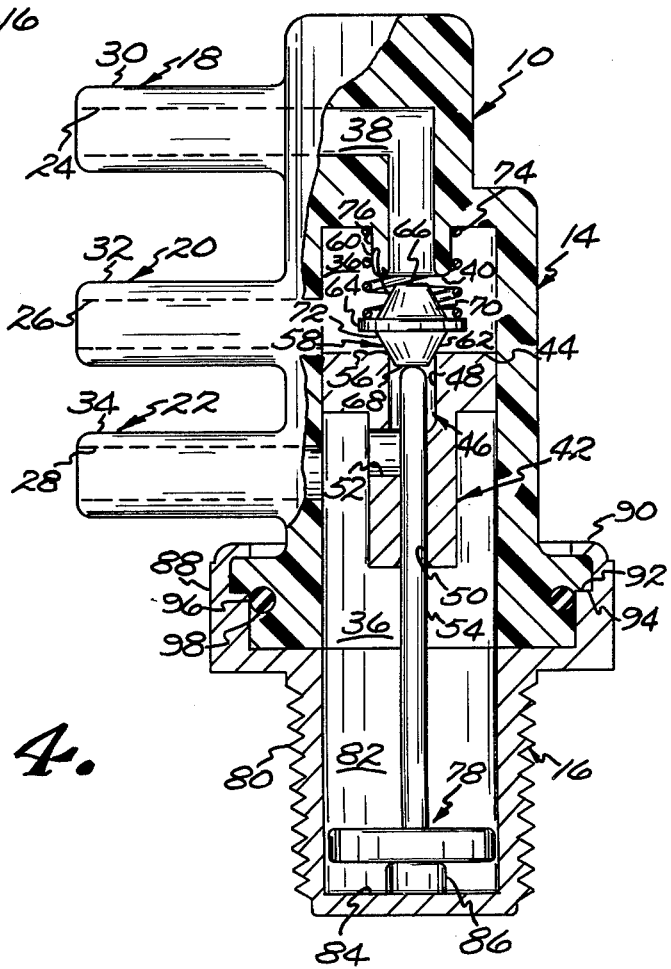
FIG. 4 is a similar view to FIG. 2 only with the lower valve seat closed.

In accordance with this invention a lower or second valve seat 56 is formed where the large diameter portion 48 or outlet of axially extending bore 46 opens into the upper portion of central cavity 36 as shown in FIGS. 2–4. Positioned betweem first valve seat 40 and second valve seat 56 is a valve plug or stopper 58 as viewed in FIGS. 2–4 with preferably a first conical portion 60 and a second conical portion 62 with a circular flange piece 64 positioned between portions 60 and 62. Stopper 58 may conveniently be formed from a single piece of material such as rubber. The two conical portions 60 and 62 may have an acute included angle such as 60° so that the two external ends 66 and 68 have diameters smaller than those of valve seats 40 and 56 while the internal ends 70 and 72 have diameters larger than valve seats 40 and 56. The purpose of conical shaped portions 60 and 62 of stopper 58 is to allow them to reliably seal the valve seats.

A coil spring 74 is shown in FIGS. 2–4 at one end fits over tubular portion 76 at the opening of connecting passage 38 into cavity 36 and at the other end rests on flange piece 64 of stopper 58. Spring 74 serves to bias stopper 58 and correspondingly transfer pin 54 downward as shown in FIGS. 2–4. The spring has a predetermined spring constant which is compatible with the snap-force of a bimetallic disc assembly 78 to be discussed further below.

A second valve body part is generally indicated by numeral 16 and is shown to comprise a cup-shaped member adapted to be sealingly secured to first body part 14. More particularly second body part 16 comprises a member of thermally conductive material such as brass having a hollow externally threaded portion 80 and central cavity 82 with preferably a flat bottom 84 with a support post 86 disposed therein. The support post 86 preferably has a centrally located pin 87 as shown only in FIG. 3 on which the bimetallic disc assembly 78 rests.

Accordingly body part 16 has a hexagonal shaped portion 88 enabling the valve assembly 10 to readily be inserted in a threaded hole and also a relatively thin wall 90 extending upwardly from the hexagonal shaped portion 88. A shoulder 92 is formed at the junction of wall 90 with the remainder of portion 88 and against a first circular projection 94 of body part 14 bears when the two body parts are assembled. A sealing gasket 96 (e.g. an O-ring) is disposed in a notched portion 98 of body part 14 and is compressed when side wall 90 is rolled over to sealingly secure the two valve portions together to form valve body 12.

Figure 5:
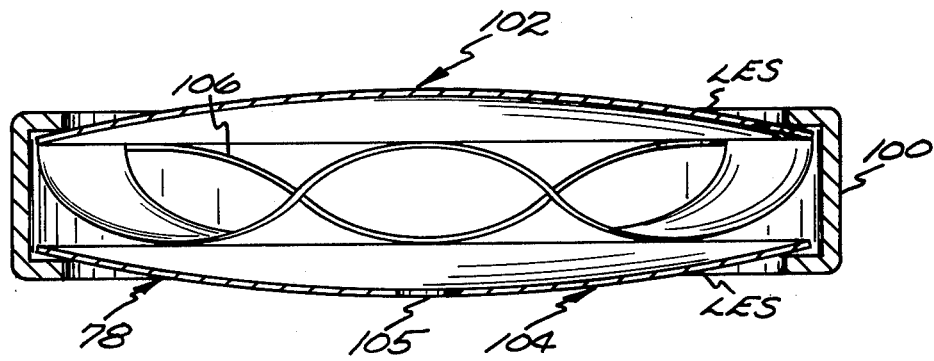
FIG. 5 is a cross-sectional view of a bimetallic assembly of FIGS. 2–4.

As best shown by FIG. 5 bimetallic assembly 78 comprises a carrier or support housing 100, a first and a second dish-shaped bimetallic element 102 and 104, and a wave spring 106. Dish-shaped bimetallic elements 102 and 104 each have one layer of metal of a low thermal coefficient of expansion and another layer of metal of a somewhat higher thermal coefficient of expansion so that at respective predetermined temperatures the elements will snap over center to an inverted dish-shaped configuration. The metal materials and the amount of preforming or dishing for the two bimetallic elements 102 and 104 are chosen such that the two snap over center at different temperatures.

Accordingly first dish-shaped element 102, wave spring 106, and second dish-shaped element 104 are secured in support housing 100 by any conventional manner (e.g. the end portions of the walls of housing can be rolled over to secure the spring and elements as shown in FIG. 5). The two dish-shaped elements 102, 104 are preferably positioned in the housing so as to have an initial concave outward orientation with the low expansion side (LES) of the material facing outward from the center of the assembly. The bimetallic assembly has a first position when both first and second member elements 102 and 104 are positioned concave outward as shown by FIGS. 2 and 5, a second position when first member 102 is concave inward and second member 104 is concave outward as shown in FIG. 3, and a third position when both first and second members are concave inward as shown by FIG. 4. Preferably element 104 has a central aperature 105 for receiving the pin of support post 86.

The transfer pin 54 extends through axial bore 46 with one end in contact with stopper 58 and the other end resting on bimetallic disc assembly 78. The alignment of pin 54 is preferably controlled by the smaller diameter portion 50 of axial bore 46 in which the size of the bore is just large enough to slidingly receive the pin. The pin may be made from any suitable material such as low carbon steel. If desired the rubber plug and the transfer pin can be secured together to form a single control member. The length of pin 54, the distance between valve seats, and the distance the two bimetallic members snap are coordinated such that when bimetallic assembly 78 is in its first, second, or third position, stopper 58 is correspondingly in engagement with the first valve seat, positioned between the two valve seats, or in engagement with the second valve seat.

Valve assembly 10 is particularly adapted to be threaded into an object, such as an automotive engine block or the like, to transfer heat from the engine block to bimetallic assembly 78 so as to heat the member in response to a corresponding temperature increase of the engine block. Upon cooling of the engine block, the member will also be maintained at approximately the temperature of the engine.

When valve assembly 10 is installed in a cold engine bimetallic assembly 78 is in the first position as shown in FIG. 2 thus providing that stopper 58 seals first valve seat 40. This condition allows for passage between ports 20 and 22. As the engine heats up to say 125° F., bimetallic member 102 snaps to an inverted dish-shaped configuration thereby providing for stopper 58 to move out of engagement with first valve seat 40 and move to a position between the two valve seats as shown by FIG. 3. This condition allows for passage between ports 18 and 20 and 20 and 22. Then as the engine heats up more to say 150° F. bimetallic member 104 snaps to an inverted dish-shaped configuration thereby providing for stopper 58 to move into engagement with second valve seat 56 as shown by FIG. 4. This condition allows for passage between ports 18 and 20.

In a typical automotive emission control system the snap temperatures of both member 102 and 104 are below a mean operating temperature to which the valve may be subjected. The temperature override beyond the valve switching temperature will cause the bimetallic members to continue to creep after snapping thereby exerting more force on the stopper. In order to avoid compression set of the elastomeric valve material and overstressing of the bimetallic members, wave spring 106 is employed to absorb some of the force by deflecting at a predetermined force level.

It should be understood that the disc can be initially positioned in any desired dishing configuration and the above-mentioned embodiment shows but one preferred thermally responsive control mechanism. It is within the scope of this invention to cover any thermally responsive control mechanism of the character above-described comprising a housing with a control member mounted on the housing for movement between various control positions in response to actuation by thermally responsive dish-shaped members mounted in a carrier in the housing.

Although the present invention has been shown and illustrated in terms of a specific preferred embodiment, it will be apparent that changes and modifications are possible without departing from the spirit and scope of the inventions as defined in the appended claims.

I claim:

1. A thermally responsive valve assembly comprising a valve body, said body having a first and a second passage therein, two valve seats disposed in said body, the first positioned in said first passage and the second positioned in said second passage, and valve means including a plurality of bimetallic members and a valve seat sealing means, said bimetallic members movable in response to temperature change at distinctly different temperatures to cause said valve seat means to move into and out of engagement with said first and said second seats thereby providing for communication in only the first passage, communication in only the second passage, and communication in both passages.

2. A thermally responsive valve assembly comprising a valve body, said body having a first and a second passage therein, two valve seats disposed in said body, the first positioned in said first passage and the second positioned in said second passage, and valve means including a bimetallic disc assembly and a valve seat sealing means, said disc assembly having a plurality of bimetallic members which are movable in response to temperature change at distinctly different temperatures to cause said valve seat sealng means to move into and out of engagement with said first and said second seats thereby providing communication in only the first passage, communication in only the second passage, and communication in both passages.

3. A thermally responsive valve assembly as set forth in claim 2 wherein valve seat sealing means comprises a stopper to seal and said first and said second valve seats, spring means biasing said stopper against said bimetallic disc assembly, and motion transfer means to cause said stopper to move into and out of engagement with said valve seats in response to movement of said bimetallic members.

4. A thermally responsive valve assembly as set forth in claim 3 wherein said plurality of bimetallic members is two.

5. A thermally responsive valve assembly as set forth in claim 4 further comprising a wave spring positioned between the two bimetallic members.

6. A thermally responsive valve assembly comprising a valve body having a first part at one end of said valve body and a second part at another end of said body, the first part of the body having a first, a second, and a third port, said ports being adapted for connection to fluid lines, a central cavity into which all ports communicate, two passages defined in said body, said first passage connecting said first port and said second port and said second passage connecting said second port and said third port, two valve seats disposed in said body, the first positioned in said first passage and the second positioned in said second passage, and valve means movable into and out of engagement with said first and second seats thereby providing for communication in only the second passage, communication in both passages, and communication in only the first passage, said valve means comprising a stopper to seal said first and second valve seats, a bimetallic assembly having two bimetallic members each responsive to temperature change, said members actuable at different temperatures thereby providing for bimetallic assembly having a first, a second, and a third position, motion transfer means causing said stopper to move from engagement with said first valve seat to a position between the two valve seats to engagement with said second valve seat when bimetallic assembly moves respectively from said first position to said second position to said third position, and spring means biasing said motion transfer means against said bimetallic assembly, and the second part of the body including a thermally conductive portion adapted for heat-exchange with an object, such as an engine, for transferring heat to and from said bimetallic member to increase and decrease the temperature of the member in response to a corresponding increase and decrease in temperature of said object.

7. A thermally responsive valve assembly as set forth in claim 6 further comprising a wave spring positioned between said two bimetallic members.

8. A thermally responsive valve assembly as set forth in claim 7 wherein said stopper is resilient and flexible with a first conical portion and a second conical portion with a flange piece positioned between.

9. A thermally responsive valve assembly as set forth in claim 8 wherein valve means includes a connecting passage between said first port and said cavity, the outlet of said connecting passage into said cavity serving as said first valve seat and a bushing disposed between the second and third ports, a passage having an inlet and an outlet formed through the bushing in communication with the second and third ports, the outlet of said bushing passage serving as said second valve seat.

10. A thermally responsive valve assembly as set forth in claim 9 wherein said thermally conductive portion is made of metallic material having relatively high thermal conductivity, said thermally conductive portion having a threaded portion thereof adapted to be threaded in an opening in said object to insure good heat transfer relation between said object and said bimetallic member.

11. A thermally responsive control mechanism comprising a housing, a control member mounted on the housing for movement between a plurality of control positions, means biasing the control member for movement relative to the housing between said control positions, first and second thermally responsive, bimetallic, dish-shaped members each having a peripheral portion of selected configuration, said first dish-shaped member being movable with snap-action from an original dished configuration to an inverted dished configuration when heated through a first temperature range and from said inverted dished configuration to said original dished configuration when subsequently cooled through said first temperature range, said second dish-shaped member being movable with snap-action from an original dished configuration to an inverted dished configuration when heated through a second temperature range and from inverted dished configuration to said original dished configuration when subsequently cooled through said second temperature range, and carrier means engaging said peripheral portions of said dish-shaped members securing said dish-shaped members in spaced facing relation to each other with one of said dish-shaped members engaging said control member and the other of said dish-shaped members engaging said housing to successively position said control member in respective control positions when said dish-shaped members are moved between original and inverted configurations thereof in response to selected temperature changes.

12. A thermally responsive control mechanism comprising a housing, a control member mounted on the housing for movement between first, second, and third control positions, means biasing said control member for movement relative to the housing from said first control position toward said second and third control postions, first and second thermally responsive, bimetallic, dish-shaped members each having a peripheral portion of selected configuration, said first dish-shaped member being movable with snap-action from an original dished configuration to an inverted dished configuration when heated through a first temperature range and from said inverted dished configuration to said original dished configuration when subsequently cooled through said first temperature range, said second dish-shaped member being movable with snap-action from an original dished configuration to an inverted dished configuration when heated through a second temperature range and from said inverted dished configuration to said original dished configuration when subsequently cooled through said second temperature range, and carrier means engaging said peripheral portions of said dish-shaped members securing said dish-shaped members in spaced facing relation to each other to form an actuator assembly, said acutator assembly being movably mounted in said housing with one of said dish-shaped members engaging said control member and the other of said dish-shaped members engaging said housing to successively position said control member in said first, second, and third control positions when said dish-shaped members are heated from a temperature below said first temperature range to a temperature above said second temperature range.

* * * * *